Feb. 18, 1936.  G. H. BROWNING  2,031,207

COMPENSATED WATTMETER

Filed Jan. 31, 1934

Inventor
Glenn H. Browning
by Wright, Brown, Quinby & May
Attys.

Patented Feb. 18, 1936

2,031,207

UNITED STATES PATENT OFFICE 2,031,207

COMPENSATED WATTMETER

Glenn H. Browning, Winchester, Mass., assignor to Doble Engineering Company, Medford, Mass., a corporation of Massachusetts Application January 31, 1934, Serial No. 709,158

17 Claims. (Cl. 171—34)

The present invention relates to wattmeters and particularly to wattmeters which have been made extremely sensitive by the provision of a current circuit having high impedance. One of the uses of such a wattmeter is to measure the energy loss in insulation of high resistance and low charging current, such as terminal bushings of oil circuit breakers, insulators for high tension lines, sheathed electric cable, etc., when a high potential alternating current is applied to the insulation under conditions which give a known potential drop across the insulation. In these circumstances, since the insulation resistance is high and the watts loss is usually low, it is desirable to use a wattmeter with a current circuit of high impedance in order to produce a wide enough movement of the indicator to give close readings.

To get this effect requires that a large number of turns of fine wire be used in the current coil or coils of the wattmeter. Consequently there is a considerable distributed capacity in the coil itself as well as a capacitance between the coil and the adjacent metal parts of the wattmeter. These capacitances have a vitiating effect on the indication of the instrument due to the currents which are thereby set up in the current coil when the voltage circuit of the wattmeter is energized. If voltage is applied to the voltage circuit terminals of such a wattmeter when the current coils are not connected in circuit, a deflection, usually negative, of the index occurs. Such deflection is a component of the movement of the index when both sets of terminals of the instrument are connected up in the manner required for measuring watts, and vitiates all readings, unless compensated for or taken into consideration when the calibration is made.

A further error of the same type is added when the wattmeter is used in connection with associated apparatus which produces the effect of a capacitance connected across the current circuit. Such an external capacitance is found, for example, in the shielding means and intermediate insulation of the high tension lead shown in the Frank C. Doble Patent No. 1,945,263, dated January 30, 1934, wherein the inner shield 37, which is a guard shield connected to one terminal of the high voltage source at 35, and the grounded shield 38, present a capacitance in parallel with the current circuit of the wattmeter 17. This reference to the Doble patent is illustrative of external capacitances which may be found to exist in connection with the use of a wattmeter, and which have an influence on the reading of the wattmeter, similar in kind to that of the internal capacitances first described.

The object of the present invention is to nullify or neutralize the effect of such capacitances on wattmeters of the sensitive type here referred to, whether the disturbing capacitance is internal or external, or both internal and external. The invention therefore consists in a compensating means for that purpose and in the combination of the wattmeter with such compensating means. The principles of the invention and two of the possible forms in which it may be embodied, are shown for illustration in the drawing presented herewith and are described in detail in the following specification.

In the drawing,—

Like reference characters designate the same parts wherever they occur in all the figures.

Figure 3:
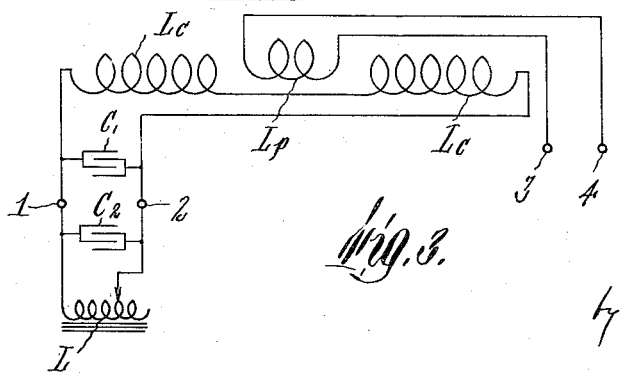
Fig. 3 is an electrical diagram illustrating the principles on which the invention is founded.

Referring first to Fig. 3 for explanation of the principles involved, $L_c$ represents the current coil or coils of the wattmeter having terminals 1 and 2 for connection with an external circuit, and $L_p$ represents the voltage coil or coils having external terminals 3 and 4. There is a mutual inductance between the coils $L_c$ and $L_p$. $C_1$ represents diagrammatically the capacitance due to all the capacitances within the meter itself, and it is here shown diagrammatically as connected in parallel with the current coil. The capacitances thus represented may be distributed capacitance of the current coil and/or capacitance from the coils to other metal parts which, from an electrical standpoint, appear to be in parallel with the coil. $C_2$ represents in a similar way all the capacitances of the equipment with which the meter is used, which are external to the meter and are in effect connected across the current coil when the meter is in use. The diagram makes it plain that, if the voltage coil $L_p$ is energized, a current is set up in the current coil due to mutual inductance, which flows through the capacitances $C_1$ and $C_2$ to complete the circuit. The phase of this current is such that the deflection of the wattmeter index is negative. In other words, the deflection or deflecting tendency is opposite to that caused by the current which flows when the current coil terminals 1 and 2 are connected in an external circuit.

If there were no capacitances corresponding to those designated as $C_1$ and $C_2$, and if an inductance were connected across the terminals 1 and 2, the wattmeter would under the same conditions give a positive deflection. I have utilized the principle of such an inductance to compensate for the negative deflection caused by either or both of the capacitances. This is represented in the diagram as an adjustable inductance L in shunt connection with the current coil and capacitances. The combination of such an inductance, or its practical equivalents presently described, with the wattmeter, constitutes the essence of this invention. It is part of my contemplation to make the inductance of such large magnitude, and of the proper magnitude, to balance and neutralize the deflecting effect or tendency of the internal capacitances of the wattmeter, and the parallel external capacitances, when such are present, of the equipment with which the wattmeter is used.

Figure 2:
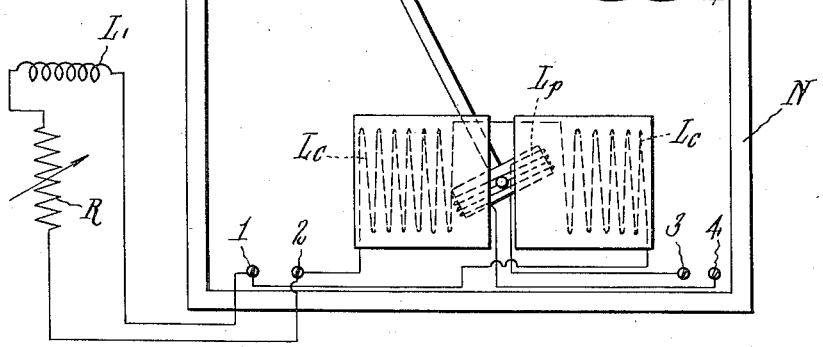
Fig. 2 is a similar view showing an alternative form of compensating means.

However, as the value of the sum of these capacitances varies under different conditions, and it is not convenient in practice to adjust an inductance of such large magnitude as is required for my purpose, through a sufficiently wide range to balance exactly such variable values, I have devised an equivalent compensating means which is illustrated in Fig. 2 and which comprises a nonadjustable inductance $L_1$ and a variable resistance R, in series. This combination of inductance and variable resistance serves all the purposes of the adjustable inductance, but is more convenient and practicable to use. It may be mounted within or outside of the case of the wattmeter. That is, within the principle of the invention, it is immaterial what the space relationship of these elements may be. But inasmuch as the inductance-resistance elements may be bulky, it is practically more convenient to mount the wattmeter alone in its own case and provide the inductance-resistance unit as a separate structure, the terminals of which are connected in shunt with the terminals of the current coil $L_c$.

The effect of the inductance, and equally of the inductance-resistance combination, in parallel with the capacitance $C_1$ and/or $C_2$ is to make up a high-impedance electrical circuit in parallel with the current coil $L_c$. The impedance of this combination is large as compared with the impedance of the current coil, so that the sensitivity of the compensated wattmeter is essentially as great as without the compensating means. If the inductance L and correspondingly the combination $L_1R$ be of correct value to tune the capacitances across $L_c$ to resonance at the frequency of the voltage applied to the potential coil $L_p$, the impedance of this capacity-resistance-inductance combination would be $$\frac{L}{CR_1}$$

where C is equal to the sum of $C_1$ and $C_2$, that is, the total capacitance in parallel with the current coil, L represents the total external inductance in the circuit, that is, the inductance of L, as well as any inductance in the leads to L. $R_1$ represents the resistance in the inductance L as well as any leakage resistance in the capacities $C_1$ and $C_2$, or if resistance is placed in series with L as shown in Figure 2, $R_1$ would then represent R plus the resistance of the inductance L as well as the leakage resistance of $C_1$ and $C_2$. However, it is not essential to obtain exact resonance in order to get satisfactory effects. It is sufficient if the current induced in coil $L_c$ by voltage flowing through the voltage coil $L_p$ is impeded to a value where its effect or tendency of deflecting the meter index is negligible.

It will be appreciated that the adjustability of the impedance effect is desirable in order to adjust the compensated wattmeter to the conditions which it will encounter when used with associated apparatus, and to correct its compensation to meet changing conditions or different conditions. However, the invention in its broadest aspects is not limited to adjustability; and the invention also includes sub-combinations as well as the complete combination of the compensating means here shown.

Figure 1:
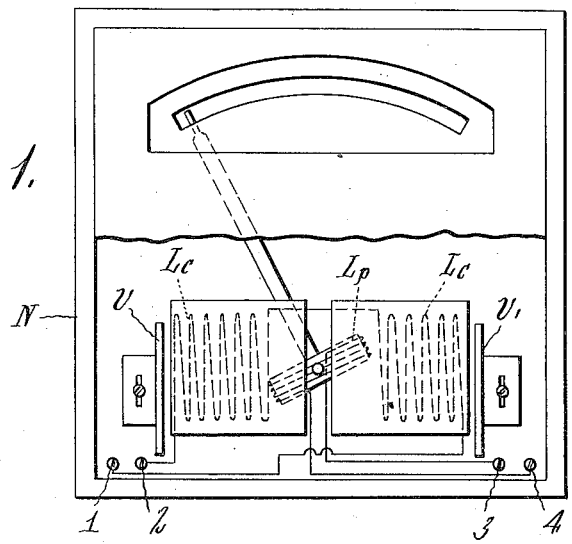
Fig. 1 is a diagrammatic plan view of a wattmeter equipped with the preferred type of compensating means containing the invention.

A further alternative equivalent compensating means consists of a device or devices arranged with respect to the current coil $L_c$ in such manner as to affect the magnetic field of the coil. The preferred embodiment of this means is shown in Fig. 1 and consists of vanes or plates V and $V_1$ mounted adjacent to the opposite ends of the coil $L_c$ with capacity for adjustment either toward and away from the coil or crosswise of the axis of the coil. The vanes set up a field of magnetic force in such a phase and direction as to oppose and nullify the magnetic field set up due to the induced current in the current coil which flows through the capacitances represented in the foregoing explanation by $C_1$ and $C_2$. By suitable adjustment of the vanes a substantially exact balance may be obtained. Then the wattmeter index has no tendency to deflect when the potential coil only is energized.

The most powerful and sensitive effects in these regards are obtained when the vanes referred to are of magnetic material and are used in combination with magnetic shielding of the coils. As a matter of practice, magnetic shielding is used with such sensitive instruments as that herein described; and such shielding is virtually essential when the sensitive wattmeter is used in connection with other equipment, as herein described to test grounded insulation with application of alternating current of high potential. The case N of the instrument constitutes such a shield.

The instrument containing shield N and vanes V, $V_1$, all of magnetic material, in combination with the current coils as shown in Fig. 1, is the preferred embodiment of the invention, and is preferred to the equivalent combination of inductance, or inductance and resistance, on account of its compactness and greater permanence in adjusted condition. It is to be understood, however, that the vanes, or equivalent masses of material suitable for influencing the magnetic field in the desired manner, may be used without the shield N or its equivalent. While the vanes are preferably of magnetic material for maximum effect, they may be made instead of non-magnetic materials provided such materials are electrical conductors. It should be understood further that in designating the members V and $V_1$ as vanes, I have intended merely to illustrate the principle by reference to a concrete embodiment, and not to imply any limitation as to the form, dimensions or mass necessarily incorporated in such members. Bodies of other shapes and proportions than those answering the specific definitions of the word "vane" are equivalent, and are comprised within the scope of that term as used in this specification for the purposes of the invention.

In effecting compensation of the wattmeter by adjustment of the vanes last described to nullify both internal and external capacitances, a condenser equivalent to the capacitance presented by associated apparatus is connected across the current coil Lc, the correct alternating potential is applied to the terminals 3, 4, and the vanes are shifted transversely of the current coil axis until the index of the wattmeter shows essentially a zero deflection. If compensation is made for internal capacitance alone, the connection with an external condenser is omitted, but otherwise the procedure is the same. The adjustment of the other compensating means described, (i. e., inductance or inductance-resistance combination), is made in essentially the same way, except that the variable resistance R is adjusted until the indicator will occupy substantially its zero position when alternating voltage is applied to the voltage coil.

What I claim and desire to secure by Letters Patent is:

1. A wattmeter having a current circuit of high impedance combined with means for cancelling the effects due to such impedance on the indications of the instrument.

2. In a wattmeter having a movable voltage coil and a current coil of such high impedance that alternating voltage applied to the voltage coil induces current in the current coil circuit sufficient to deflect the voltage coil when the current coil is disconnected from external sources of current; the combination therewith of means influencing said current in the current coil for opposing the said induced current effects.

3. In a wattmeter having a deflectable voltage coil, a current circuit, and a deflection indicator, and in which the current circuit has a relatively high impedance, means for nullifying the effects of distributed capacity, due to the construction of such high-impedance circuit, on the voltage coil, so that when an alternating voltage is applied to said voltage coil with the current circuit disconnected from external sources of excitation, substantially no deflection thereof will take place.

4. In a wattmeter having a current circuit of such high impedance that its distributed capacitance acts electrically as a capacitance across said circuit, compensating means consisting essentially of an inductance connected across said current circuit, the impedance of which is high in comparison with that of the said current circuit, and said inductance being of such a value that when voltage is applied to the voltage circuit of the wattmeter while the current circuit is unconnected with any external source of current, the deflection indicator will remain substantially in zero position.

5. In a wattmeter having a current circuit of such high impedance that its distributed capacitance acts electrically as a capacitance across said circuit, compensating means consisting essentially of an inductance and a resistance connected in series across said current circuit and having values such that when voltage is applied to the voltage circuit of the wattmeter while the current circuit is unconnected with any external source of current, the deflection indicator will remain substantially in its zero position.

6. In a wattmeter having a current circuit of such high impedance that its distributed capacitance acts electrically as a capacitance across said circuit, compensating means consisting essentially of an inductance and a variable resistance in series connected across said current circuit, the combined magnitudes of which are controllable by adjustment of said variable resistance to be made of a magnitude such that when voltage is applied to the voltage circuit of the wattmeter while the current circuit is unconnected with any external source of current, the deflection indicator will remain substantially at zero position.

7. The combination with a wattmeter having a current circuit which in effect embodies a distributed capacitance, and associated apparatus including an additional capacitance connected across the current circuit, of compensating means consisting essentially of an inductance connected across said current circuit and having such a value as substantially to cancel the deflecting tendency of such capacitances on the indicator when voltage is applied to the voltage circuit of the wattmeter.

8. The combination with a wattmeter having a current circuit which in effect embodies a distributed capacitance, and associated apparatus including an additional capacitance connected across the current circuit, of compensating means consisting essentially of an inductance and a resistance connected in series across said current circuit, the values of said inductance and resistance being substantially sufficient to cancel the tendency of such capacitances to influence the indicator of the wattmeter when alternating voltage is applied to the voltage coil of the wattmeter.

9. In a wattmeter having a current circuit of such high impedance that its distributed capacitance acts electrically as a capacitance across said circuit, compensating means consisting essentially of a variable resistance connected across the current circuit and having a value substantially sufficient to prevent deflection of the wattmeter indicator when voltage is applied to the voltage coil of the wattmeter and the current circuit is out of connection with any external source of current.

10. Means for compensating a wattmeter for deflection of its indicator due to effects induced by current flowing through the current coil of the wattmeter, consisting of material bodies of electrically conductive material positioned in such propinquity to said current coil as to set up a magnetic field of force of such phase and direction as to oppose said effects.

11. Means for compensating a wattmeter in which the current circuit has distributed capacitance, or capacitance to other metal parts, such that said capacitances act electrically as a capacitance across said current circuit giving a backward reading when voltage is applied to the voltage coil, consisting essentially of conducting material close to, but out of direct connection with, said current circuit; said conducting material being adjustable to a position such that when voltage is applied to the voltage circuit of the wattmeter and the current circuit is unconnected with any external current source, the deflection indicator will remain substantially in zero position.

12. Means for compensating a wattmeter in which the current circuit has distributed capacitance, or capacitance to other metal parts, such that said capacitances act electrically as a capacitance across said current circuit, consisting essentially of magnetic material close to, but out of direct connection with, said current circuit; said magnetic material being adjustable to a position such that when voltage is applied to the voltage circuit of the wattmeter, while the current circuit is unconnected with any external current source, the deflection indicator will remain substantially in zero position.

13. The combination with a wattmeter having a current circuit which in effect embodies a distributed capacitance, and associated apparatus including an additional capacitance connected across the current circuit, of compensating means consisting essentially of conducting material close to, but not directly connected with, said current circuit, said conducting material being adjustable to a position near said current circuit such that when voltage is applied to the voltage coil of the wattmeter while the current circuit is unconnected with any external current source, the deflection indicator remains substantially in its zero position.

14. The combination with a wattmeter having a current circuit which in effect embodies a distributed capacitance, and associated apparatus including an additional capacitance connected across the current circuit, of compensating means consisting essentially of magnetic material close to, but not directly connected with, said current circuit, said magnetic material being adjustable to a position near said current circuit such that when voltage is applied to the voltage coil of the wattmeter while the current circuit is unconnected with any external source of current, the deflection indicator remains substantially in its zero position.

15. A wattmeter having compensating means for balancing aberrations in the indications of the instrument due to capacitance, of associated apparatus with which the wattmeter is used, across the current coil of the meter.

16. In a wattmeter having a current circuit of high impedance, compensating means for correcting aberrations in the indications of the instrument due to such high impedance, said means consisting essentially of an inductance connected across said current circuit, the impedance of said inductance being high in comparison with the impedance of said current circuit, and said inductance being of such value as to cause the deflection indicator of the meter to remain substantially in zero position when voltage is applied to the voltage circuit of the meter and the current circuit is unconnected with any external current source.

17. Means for compensating a wattmeter in which the current circuit has distributed capacitance, or capacitance to other metal parts, such that said capacitances act electrically as a capacitance across said current circuit to give a backward reading when voltage is applied to the voltage coil; said compensating means consisting essentially of an inductance connected across said current circuit, the impedance of which is high in comparison with that of the current circuit, and said inductance being of a value adequate to prevent substantial deflection of the indicator of the meter when voltage is applied to the voltage circuit and the current circuit is unconnected with any external current source.

GLENN H. BROWNING.